United States Patent [19]
Jones et al.

[11] Patent Number: 5,913,330
[45] Date of Patent: Jun. 22, 1999

[54] PRESSURE/VACUUM RELIEF VALVE ASSEMBLY

[75] Inventors: George Donald Jones, Sapulpa; Glenn Scott Linden, Owasso, both of Okla.

[73] Assignee: Enardo Manufacturing Company, Tulsa, Okla.

[21] Appl. No.: 08/772,074

[22] Filed: Dec. 19, 1996

[51] Int. Cl.$^6$ .................................................. F16K 17/26
[52] U.S. Cl. .............................. 137/493.8; 137/533.25; 137/533.29
[58] Field of Search ................ 137/533.25, 533.29, 137/533.31, 493.8, 543.23

[56] References Cited

U.S. PATENT DOCUMENTS

| | | | |
|---|---|---|---|
| 412,480 | 10/1889 | Davis | 137/533.25 |
| 442,284 | 12/1890 | Craig . | |
| 839,855 | 1/1907 | Jones . | |
| 854,908 | 5/1907 | Pogue . | |
| 1,072,673 | 9/1913 | Thelen . | |
| 1,077,415 | 11/1913 | Massey . | |
| 1,353,409 | 9/1920 | McEvoy . | |
| 1,672,504 | 6/1928 | Sauvey et al. . | |
| 2,301,276 | 11/1942 | Gussick . | |
| 2,402,713 | 6/1946 | Volpin . | |
| 2,483,572 | 10/1949 | Cater . | |
| 2,511,983 | 6/1950 | Hooper . | |
| 2,943,639 | 7/1960 | Smith . | |
| 3,083,723 | 4/1963 | Duchin | 137/543.23 |
| 3,640,501 | 2/1972 | Walton . | |
| 4,091,837 | 5/1978 | Edmunds et al. . | |
| 4,337,873 | 7/1982 | Johnson | 137/493.8 |
| 4,643,221 | 2/1987 | Parker | 137/533.25 |
| 5,048,560 | 9/1991 | Jannotta | 137/493.8 |
| 5,099,878 | 3/1992 | Boehmer | 137/533.29 |
| 5,477,829 | 12/1995 | Hassinger et al. | 137/493.8 |

OTHER PUBLICATIONS

Photograph of current systems described on p. 2 of Specifications.

*Primary Examiner*—Denise L. Ferensic
*Assistant Examiner*—Ramyar Farid
*Attorney, Agent, or Firm*—Fellers, Snider, Blankenship, Bailey & Tippens, P.C.

[57] ABSTRACT

A non-sticking, field replaceable valve seat and pallet assembly for use in a pressure vacuum relief valve. The valve seat is adapted for positioning within a valve orifice inside the valve housing. The valve seat has three guide vanes spaced around and radiating inwardly from an inner wall of the valve seat, the guide vanes each having a tip. The pallet includes a pallet disc for sealingly engaging the valve seat and a cylindrical guide stem, a lower portion of which extends below the pallet disc for riding between the tips of the guide vanes. Both the valve seat and the lower portion of the guide stem are located "inside" the process where they are less apt to freeze. The distance between adjacent guide vane tips is less than the diameter of the guide stem; thus, the guide stem is prevented from moving out from between the guide vanes. The design minimizes the area of surface contact between the guide stem and the tips of the guide vanes, thus reducing potential sticking locations, allowing for smooth valve stroke during operation and reducing valve wear and flutter.

7 Claims, 3 Drawing Sheets

PRESSURE/VACUUM RELIEF VALVE ASSEMBLY

BACKGROUND OF THE INVENTION

1. Technical Field

This invention relates generally to pressure vacuum relief valves, and, more specifically, to a non-sticking valve seat and pallet assembly for use in a pressure vacuum relief valve for low pressure applications.

2. Background

Pressure vacuum relief valves are installed on storage tanks and the like, particularly hydrocarbon storage tanks, to provide protection against positive or vacuum over-pressure and to prevent air intake, evaporative losses of product, and the release of odorous and potentially explosive vapors. They are sometimes called breather vents, tank vents, and pressure vacuum release vents. Pressure vacuum relief valves are designed and utilized for both vent to atmosphere and pipe away applications.

Pressure vacuum relief valves used in the oil and gas industry generally include a valve seat, typically a ledge formed around a valve orifice as part of a cast valve housing, and a pallet or disc designed to sealingly engage the valve seat. The pallet maintains a seal until system pressure or vacuum exceeds the set pressure of the valve. When overpressure occurs the pallet lifts, breaking the seal between the valve seat and pallet, allowing vapors to pass through the valve orifice and relieving the pressure or vacuum build-up. The valve reseals upon relief and remains sealed.

Current systems use several upstanding guide pins spaced around the periphery of the pallet above the top surface of the pallet (above the process) to guide the pallet when it raises or lowers. A stem extending above the top surface of the pallet is received in a receptacle space cast into a valve housing lid and keeps the pallet from lifting too far off the valve seat.

Sludge and condensate build-up, along with temperature extremes, can interfere with valve operation. One problem with current systems, especially prevalent in low pressure applications, is the sticking or freezing of the valve seat and pallet. The ledge on which the pallet comes to rest and the multiple points of contact between the periphery of the pallet and the tangential guide pins provide a significant surface area for sticking or freezing to occur.

Another problem caused by contemporary design is valve wear and flutter. Movement of the pallet against the valve seat and guide pins eventually wears down the component elements of the valve and damages the integrity of the seal. Compounding this problem is the difficulty in replacing valve components in the field. If a valve seat is machined into the valve housing, the entire housing must be replaced after the seat becomes worn.

It is thus the object of the present invention to provide a valve seat and pallet assembly for use in pressure vacuum release valves that resists sludge and condensate build-up and otherwise prevents valve sticking and freezing.

It is another object that the valve seat and pallet assembly provide a smooth valve stroke during operation to reduce valve wear and flutter.

It is a further object that the valve components be field replaceable without the requirement for special tools or complex procedures.

SUMMARY OF THE INVENTION

These and other objects are achieved in a pressure vacuum relief valve incorporating a non-sticking, field replaceable valve seat and pallet assembly. Rather than being molded or cast as part of a valve housing, the valve seat is a separate component adapted for positioning within a valve orifice inside the valve housing. The valve seat has three guide vanes spaced around and radiating inwardly from an inner wall of the valve seat, the guide vanes each having a tip. The pallet includes a pallet disc for sealingly engaging the valve seat and a cylindrical guide stem. A lower portion of the guide stem extends below the pallet disc for riding between the tips of the guide vanes. Both the valve seat and the lower portion of the guide stem are located "inside" the process where they are less apt to freeze. The distance between adjacent guide vane tips is less than the diameter of the guide stem; thus, the guide stem is prevented from moving out from between the guide vanes. This design minimizes the area of surface contact between the valve seat and pallet, thus reducing potential sticking locations, allowing for smooth valve stroke during operation and reducing valve wear and flutter.

In accordance with another aspect of the invention, the tips of the guide vanes are radiused, or rounded-off, so as to reduce even more the area of surface contact between the guide stem and guide vanes. To help prevent sludge accumulation, the tips of the guide vanes may also be made to have a chisel point to provide a self-cleaning scraping action relative to the guide stem. In a related aspect, the upper surface of each guide vane is also radiused so as to achieve a self-draining and drip ring design. This minimizes the build-up of solid or liquid materials that might interfere with normal valve operation.

In accordance with a further aspect of the invention, the guide vanes are each of an angular design having a width that narrows from the base of the guide vane toward its tip, whereby strength is imparted to the guide vane but a minimal area of surface contact between the guide stem and the tip of the guide vane is maintained.

In accordance with yet another aspect of the invention, the valve seat and pallet are formed of a thermoplastic material, preferably polyphenylenesulfide, which provides superior resistance to corrosion, chemical attack, liquid or vapor adhesion, temperature extremes and sticking due to valve seat freeze.

A better understanding of the invention and its objects and advantages will become apparent to those skilled in this art from the following detailed description, taken in conjunction with the attached drawings, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature and not as restrictive.

DETAILED DESCRIPTION OF THE PREFERRED EMBODIMENT

Figure 1:
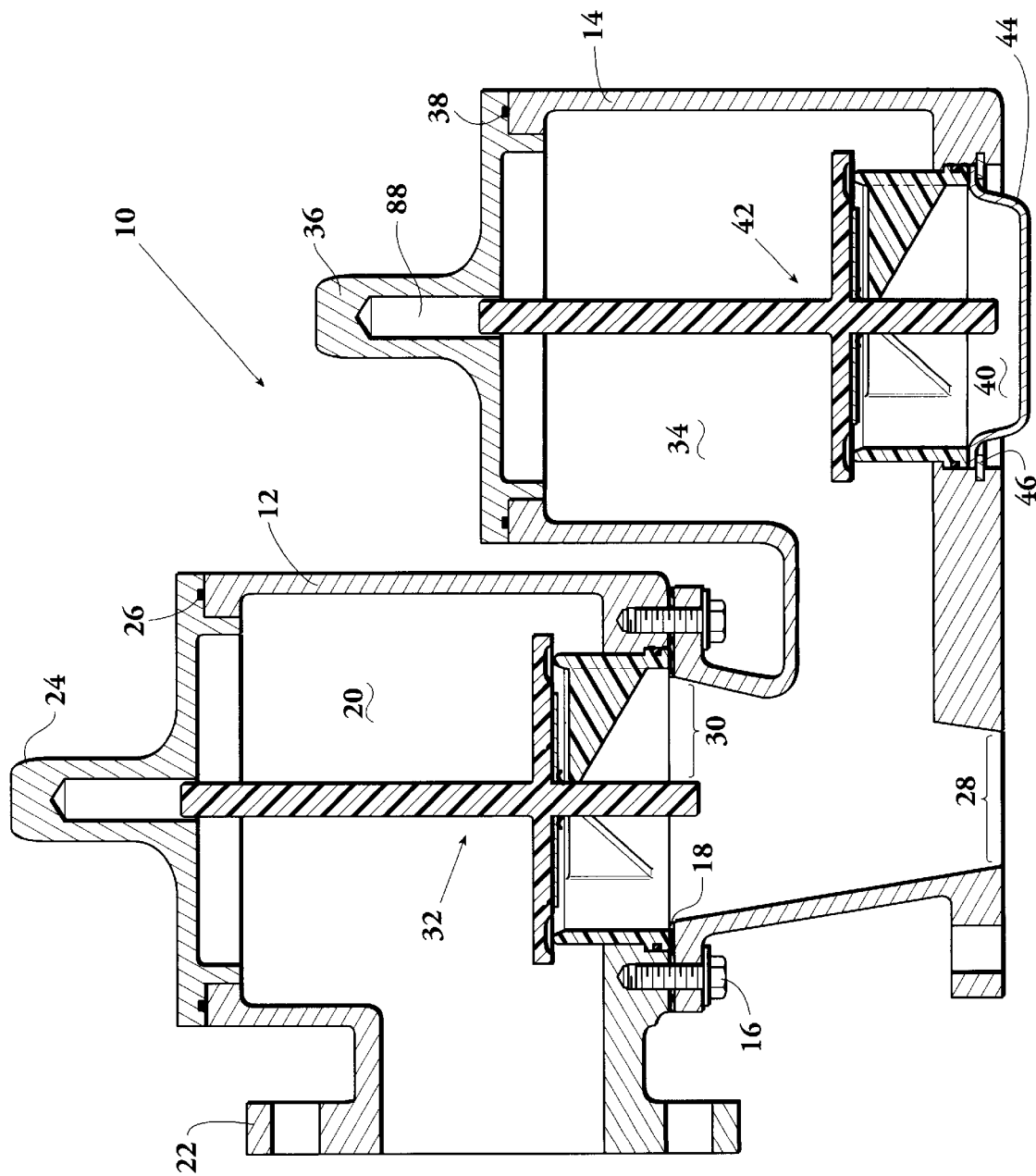
FIG. 1 is a cross sectional view of a pressure vacuum relief valve for pipe away applications incorporating the preferred valve seat and pallet assembly.

Referring initially to FIG. 1, there is shown a pressure vacuum relief valve, generally indicated by the reference numeral 10, designed for pipe away applications. It should be noted that the present invention is useful in alternate designs for other applications, such as vent to atmosphere applications. Thus the invention as described in connection with FIG. 1 is for illustrative purposes and should not to be taken to limit the application of the invention in any respect.

The pressure vacuum relief valve 10 comprises a valve housing consisting of an upper body 12 fastened to a lower body 14 by several bolts 16 (usually 4–6). A gasket 18 lies between the upper body 12 and lower body 14. The upper body 12 has an internal chamber 20 for fluid communication with an outlet connection, such as a pipe (not shown). A flange 22 provides a mating surface for the outlet connection. The upper body 12 is capped by an upper body lid 24, whose fluid tight integrity is assured by an o-ring 26.

The lower body 14 of the valve housing includes a first internal chamber 28 which communicates through an inlet connection with the interior of, for example, a storage tank (not shown). A first valve orifice 30 is formed at the point where the upper body 12 and lower body 14 are joined. A pressure relief valve assembly, generally indicated by the reference numeral 32, is positioned within the valve orifice 30 to control this fluid passageway.

The lower body 14 of the valve housing further includes a second internal chamber 34 connected for fluid communication to the first internal chamber 28. The second internal chamber 34 is capped by a lower body lid 36 and o-ring 38. The second internal chamber 34 sits above a valve orifice 40 separating the second internal chamber 34 from the atmosphere. A vacuum relief valve assembly, generally indicated by the reference numeral 42, is positioned within the valve orifice 40 to control this fluid passageway. An extension screen 44, maintained in position by a retaining ring 46, lies below the vacuum relief valve assembly 42.

The pressure relief valve assembly 32 and the vacuum relief valve assembly 42 are the same in design, and reference should be made at this point to FIGS. 2–6 which illustrate these components in more detail.

Both the pressure relief valve assembly 32 and vacuum relief valve assembly 42 comprise a non-sticking valve seat and pallet assembly. The valve seat 48 is preferably cylindrical and includes an outer wall 50 having a stepped lower portion 52 within which is a recessed area 54 containing an o-ring 56. The valve seats 48 as shown in FIG. 1 are snugly retained within the valve orifices 30, 40. With respect to the valve seat 48 residing in valve orifice 30 (the pressure relief valve assembly 32), the stepped lower portion 52 of the outer wall 50 is retained between a lip of the valve housing upper body 12 and the mating surface of the lower body 14. As for the valve seat 48 residing in valve orifice 40 (the vacuum relief valve assembly 42), the stepped lower portion 52 of the outer wall 50 is retained between a lip of the valve housing lower body 14 and the extension screen 44. In both valve seats an o-ring 56 provides fluid tight integrity.

Figure 4:
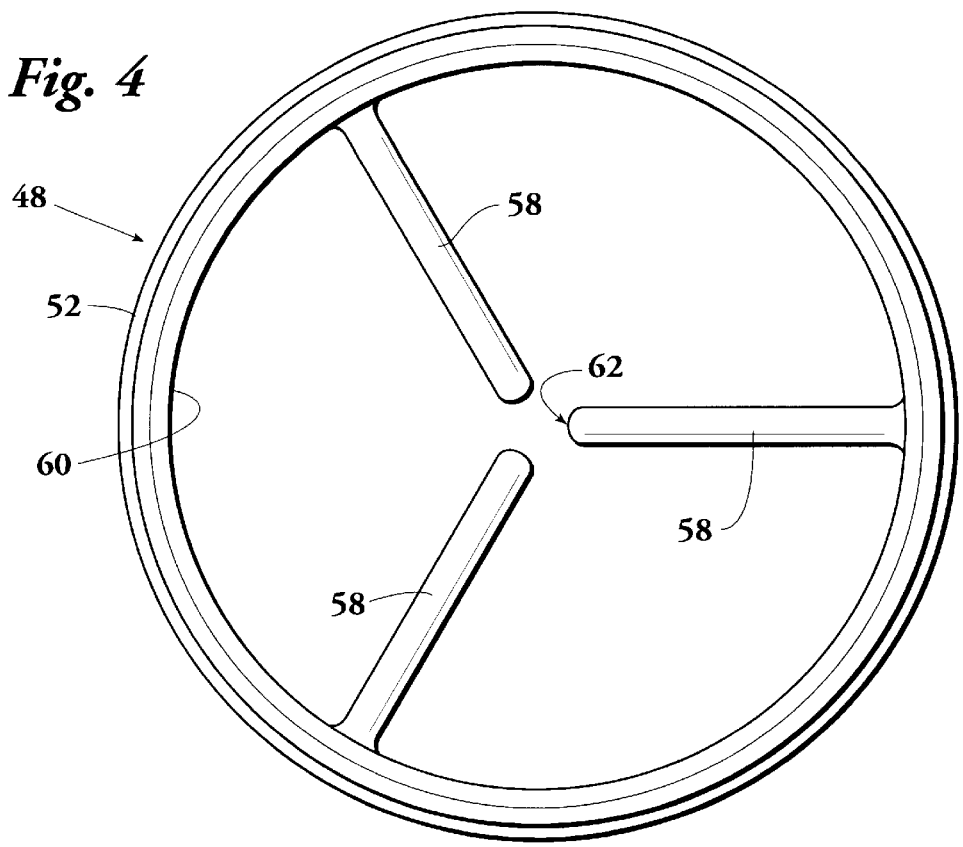
FIG. 4 is a top view of the preferred valve seat.

Three guide vanes 58 are spaced around and radiate inwardly from an inner wall 60 of the valve seat 48. Each of the guide vanes 58 has a tip 62 that is preferably radiused, or rounded off, along the horizontal as best shown in FIG. 4.

Figure 2:
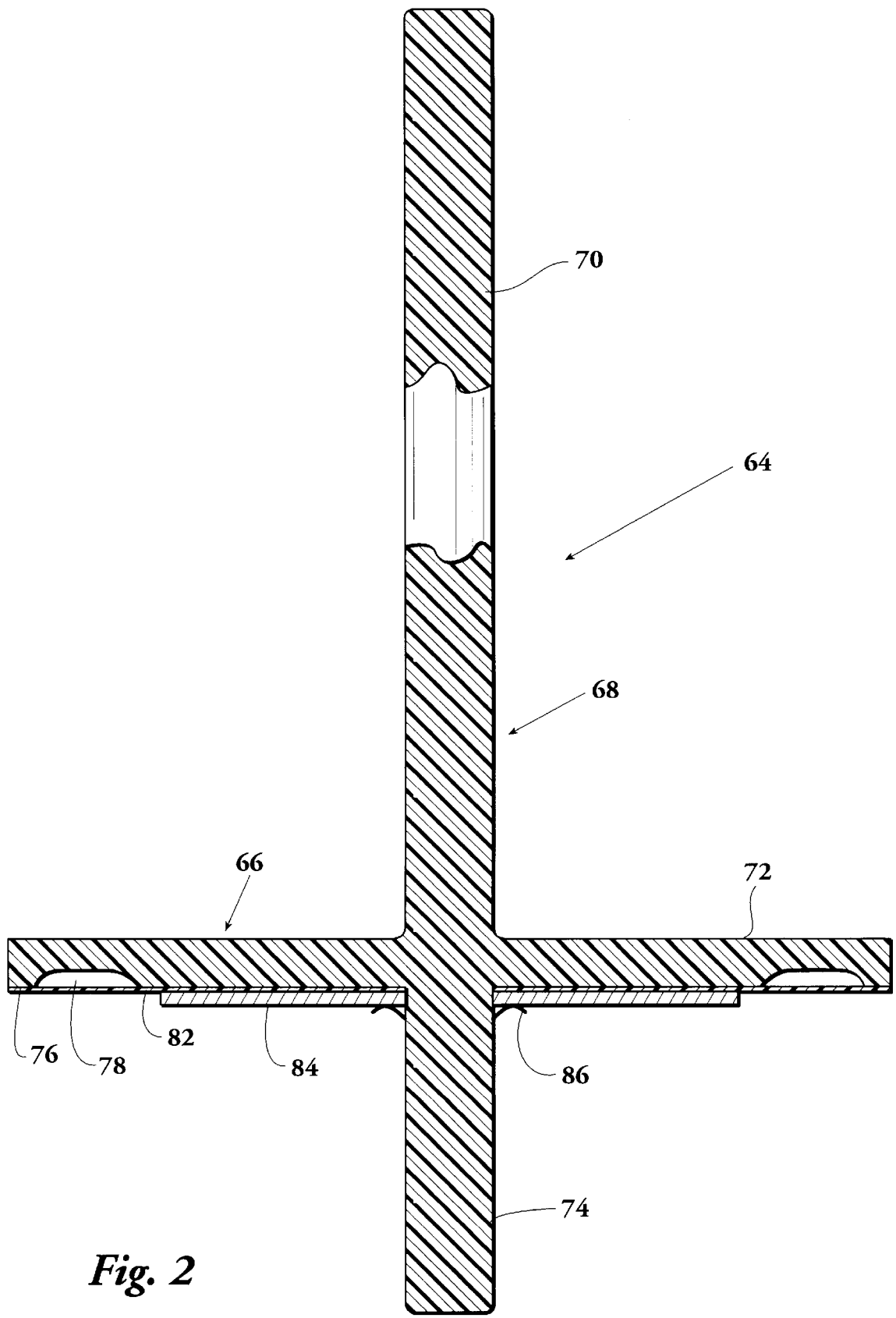
FIG. 2 is a cross sectional view of the preferred pallet.

A pallet, generally indicated in FIG. 2 as element 64, includes a pallet disc 66 for sealingly engaging the valve seat 48 and an integrally formed cylindrical guide stem, generally indicated by the reference numeral 68. The guide stem 68 includes an upper portion 70 extending above the upper surface 72 of the pallet disc 66 and a lower portion 74 extending below the pallet disc 66. The lower surface 76 of the pallet disc 66 has a circumferential recessed area 78 designed to ride above the top surface 80 of the valve seat 48.

A pallet seal 82 lies adjacent to the lower surface 76 of the pallet disc 66 and is held in place by a seal support 84. A retainer clip 86 maintains the position of the seal support 84, and, thus, the position of the pallet seal 82.

The lower portion 74 of the guide stem 68 is designed for riding between the tips 62 of the guide vanes 58. The guide stem 68 is prevented from moving out from between the guide vanes 58 as the distance between adjacent guide vane tips 62 is less than the diameter of the guide stem 68. There is only a minimal area of surface contact between the lower portion 74 of the guide stem 68 and the tips 62 of the guide vanes 58. This reduces potential sticking locations, allows for smooth valve stroke during operation and reduces valve wear and flutter. The upper portion 70 of the guide stem 68 rides in a receiving area 88 in the valve housing lid 24, 36.

The valve seat and pallet assembly as illustrated provides protection against positive or vacuum over-pressure and prevents air intake, evaporative losses of product, and helps contain odorous and potentially explosive vapors. The pallet seal 82 maintains a tight seal against the top surface 80 of the valve seat 48 until system pressure or vacuum exceeds the set pressure of the assembly. When over-pressure occurs the pallet 64 lifts, breaking the seal between the valve seat 48 and the pallet disc 66, allowing vapors to pass through the valve orifice 30, 40 and relieving the pressure or vacuum buildup. The assembly reseals upon relief and remains sealed.

With respect to the illustration in FIG. 1, should a positive pressure build in a storage tank, such as might occur during warm weather, and a positive pressure is reached exceeding the set pressure of the pressure relief valve assembly 32, the pallet disc 66 would lift off of the valve seat 48 to allow the excess pressure to escape into the internal chamber 20 of the upper body 12. Conversely, should a vacuum over-pressure occur in the storage tank exceeding the set pressure of the vacuum relief valve assembly 42, the pallet disc 66 would lift off of the valve seat 48 to allow atmospheric air to enter the second internal chamber 34 of the lower body 14 to prevent collapse of the storage vessel.

Figure 5:
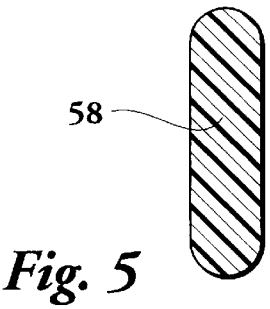
FIG. 5 is a sectional view taken along line 5—5 of FIG. 3.
Figure 6:
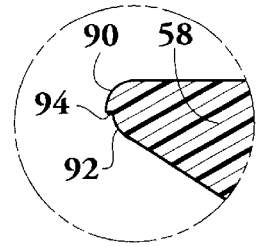
FIG. 6 is a perspective view of the indicated portion of FIG. 3.

The minimal area of surface contact between the lower portion 74 of guide stem 68 and the tips 62 of the guide vanes 58 reduces the risk of valve sticking and freezing in addition to reducing valve wear and flutter and allowing for smooth valve stroke during operation. As illustrated more particularly in FIG. 4, the tips 62 of the guide vanes 58 are preferably radiused so as to reduce even more the area of surface contact between the lower portion 74 of the guide stem 68 and the tips 62 of the guide vanes 58. Similarly, the top surface 80 of each guide vane is radiused so as to minimize the buildup of solid or liquid material that might interfere with normal valve operation. FIG. 5 shows a crosssection a radiused guide vane 58. To further reduce the risk of valve sticking or freezing, each of the tips 62 of the guide vanes 58 may also be provided with a chisel point to provide a self cleaning scraping action relative to the lower portion 74 of the guide stem 68. The chisel point, best illustrated in FIG. 6, is formed by the parting line in the mold used to make the valve seat 48. The tip of the guide vane 58 has a first downward radius 90 and a second slightly steeper upward radius 92 creating a shoulder or ledge 94. The shoulder 94 provides a scraping action against the lower portion 74 of the guide stem 68.

Figure 3:
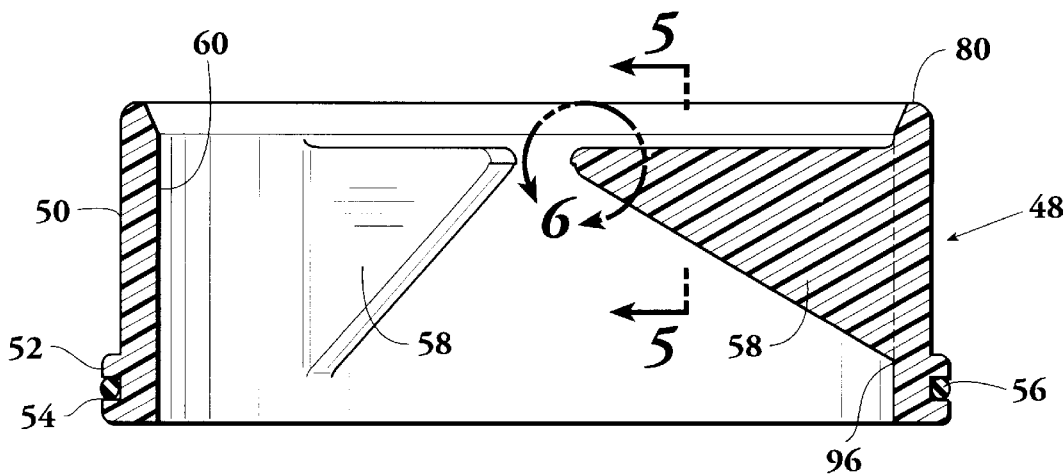
FIG. 3 is a cross sectional view of the preferred valve seat.

In the most preferred embodiment, each of the guide vanes 58 is of an angular design, such as is shown in FIG. 3, having a width that narrows from the base 96 of the guide vane 58 toward the tip 62 of the guide vane 58. With this design strength is imparted to the guide vane 58 but a minimal area of surface contact between the lower portion 74 of the guide stem 68 and the tip 62 of the guide vane 58 is maintained.

The valve seat 48 and pallet 64 are preferably formed of an engineering thermoplastic material such as polyphenylenesulfide. As the valve seat 48 is not a cast component of the valve housing, the unit is field removable and replaceable.

The present invention is particularly suited for low pressure applications. High strength castings provide added structural integrity and durability to the valve housing. Cast aluminum, ductile iron, stainless steel or vinyl ester FRP are the preferred valve housing materials of construction. The valve seat 48 and pallet 64 are preferably constructed of an advanced composite polyphenylenesulfide (PPS) such as is marketed by Phillips Petroleum Company under the trade name RYTON or by the Celanese Corporation under the trade name FORTRON. Optional materials of construction for the valve seat 48 and pallet 64 include alternative engineering thermoplastics such as polytetrafloralethalene (TEFLON), acetyl resins, polyetheretherketone, polysulfides, KYNAR or NYLON. The advanced composite thermoplastic materials provide superior resistance to corrosion, chemical attack, liquid or vapor adhesion, temperature extremes (−50 to 500° F.) and sticking due to valve seat freeze. They also shed water and reduce sludge build up. The valve seat 48 and pallet 64, if desired, can also be made of stainless steel or other suitable materials.

The preferred pallet seal 82 is an FEP TEFLON seal. Alternatively, nitrile, fluoroelastomer or other suitable seals can be used. The seal construction of the present invention exceeds the most stringent of industrial standards for allowable leakage (1 scfh @90% set point) and provides excellent set point accuracy (±3%).

Pallet weights are used to vary the set pressure of the valve seat and pallet assembly. Acceptable pallet weights include carbon steel, stainless steel, epoxy-coated carbon steel, resin coated carbon steel, lead or other weights.

Internal gasketing can be made with nitrile, fluoroelastomer, TEFLON or other suitable gasket materials.

Pressure vacuum relief valves constructed in accordance with the present invention can be sized and styled according to the required application dimensions. The valve seat 48 and pallet 64 are preferably injection molded to fit the valve orifice of the required housing. Other options include internal and external TEFLON or epoxy-coating of valve and other components and the addition of steam jackets and the like.

The present invention thus provides a valve seat and pallet assembly for use in pressure vacuum release valves that resists sludge and condensate build up and otherwise prevents valve sticking and freezing. The present invention also provides a smooth valve stroke during operation to reduce valve wear and flutter and is field replaceable without the requirement for special tools or complex procedures.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A valve assembly for relieving both vacuum and over pressure conditions in a container, said valve assembly comprising:

a body having a first port, a second port, and a third port, said body being securable such that said first port is placed in fluid communication with said container;

a first valve seat structure removably positionable in said second port;

a second valve seat structure removably positionable in said third port;

each of said valve seat structures including a fluid passage, a wall surrounding said fluid passage, and a valve seat provided at one end of said wall;

a first reciprocatable structure including a valve element and a stem extending from said valve element, said first reciprocatable structure being positionable in said body for reciprocating movement such that said valve element of said first reciprocatable structure will interact with said valve seat of said first valve seat structure to thereby open and close said second port;

a second reciprocatable structure including a valve element and a stem extending from said valve element, said second reciprocatable structure being positionable in said body for reciprocating movement such that said valve element of said second reciprocatable structure will interact with said valve seat of said second valve seat structure to thereby open and close said third port;

said first valve seat structure further including a plurality of guide vanes spaced around and radiating inwardly from said wall and extending into said fluid passage of said first valve seat structure, each of said guide vanes having an exposed, rounded distal tip for contacting said stem of said first reciprocatable structure to thereby guide said reciprocating movement of said first reciprocatable structure; and said second valve seat structure further including a plurality of guide vanes spaced around and radiating inwardly from said wall and extending into said fluid passage of said second valve seat structure, each of said guide vanes having an exposed, rounded distal tip for contacting said stem of said second reciprocatable structure to thereby guide said reciprocating movement of said second reciprocatable structure, wherein, when vacuum conditions exist in said container, said valve element of said first reciprocatable structure will move out of contact with said valve seat of said first valve seat structure such that a first fluid flows into said second port, through said first port and into said container but, when said vacuum conditions do not exist in said container, said valve element of said first reciprocatable structure will remain in contact with said valve seat of said first valve seat structure such that said second port is closed and wherein when over pressure conditions exist in said container, said valve element of said second reciprocatable structure will move out of contact with said valve seat of said second valve seat structure such that a second fluid flows out of said container, through said first port and out of said third port but, when said over pressure conditions do not exist in said container said valve element of said second reciprocatable structure will remain in contact with said valve seat of said second valve seat structure such that said third port is closed.

2. The valve assembly of claim 1, wherein an upper surface of each said guide vane is rounded for minimizing build up of solid or liquid materials that might interfere with normal valve operation.

3. The valve assembly of claim 1 further comprising a shoulder formed in said distal tips of said guide vanes.

4. The valve assembly of claim 1 wherein said guide vanes are each of an angular shape having a width that narrows from a base of said guide vane at said wall toward said distal tip of said guide vane, whereby strength is imparted to said guide vane but a minimal area of surface contact between said stem and said distal tip of said guide vane is maintained.

5. The valve assembly of claim 1 wherein said value seat structure and said reciprocatable structure are formed of a thermoplastic material.

6. The valve assembly of claim 5 wherein said thermoplastic material is polyphenylenesulfide.

7. The valve assembly of claim 1 wherein said guide vanes are integrally formed with said wall.

\* \* \* \* \*

UNITED STATES PATENT AND TRADEMARK OFFICE
CERTIFICATE OF CORRECTION

PATENT NO. : 5,913,330
DATED : June 22, 1999
INVENTOR(S) : George Donald Jones and Glenn Scott Linden It is certified that error appears in the above-identified patent and that said Letters Patent is hereby corrected as shown below:

In column 2, at the end of the "Brief Description of the Drawings", please add:

--FIG. 7 is a cross sectional view of the valve of FIG. 1 shown in an installed position on a container.--

In column 3, line 23, after "storage tank", please add --100 as shown in FIG.7--.

In column 3, line 24, please delete "(not shown)".

Please add the attached drawing as Sheet 4 of the drawings.

Signed and Sealed this

Eighteenth Day of April, 2000

Attest:

Q. TODD DICKINSON

Attesting Officer     Director of Patents and Trademarks

UNITED STATES PATENT AND TRADEMARK OFFICE
CERTIFICATE OF CORRECTION

PATENT NO : 5,913,330  
DATED : June 22, 1999  
INVENTOR(S) : George Donald Jones and Glenn Scott Linden It is certified that error appears in the above-identified patent and that said Letters Patent is hereby corrected as shown below:

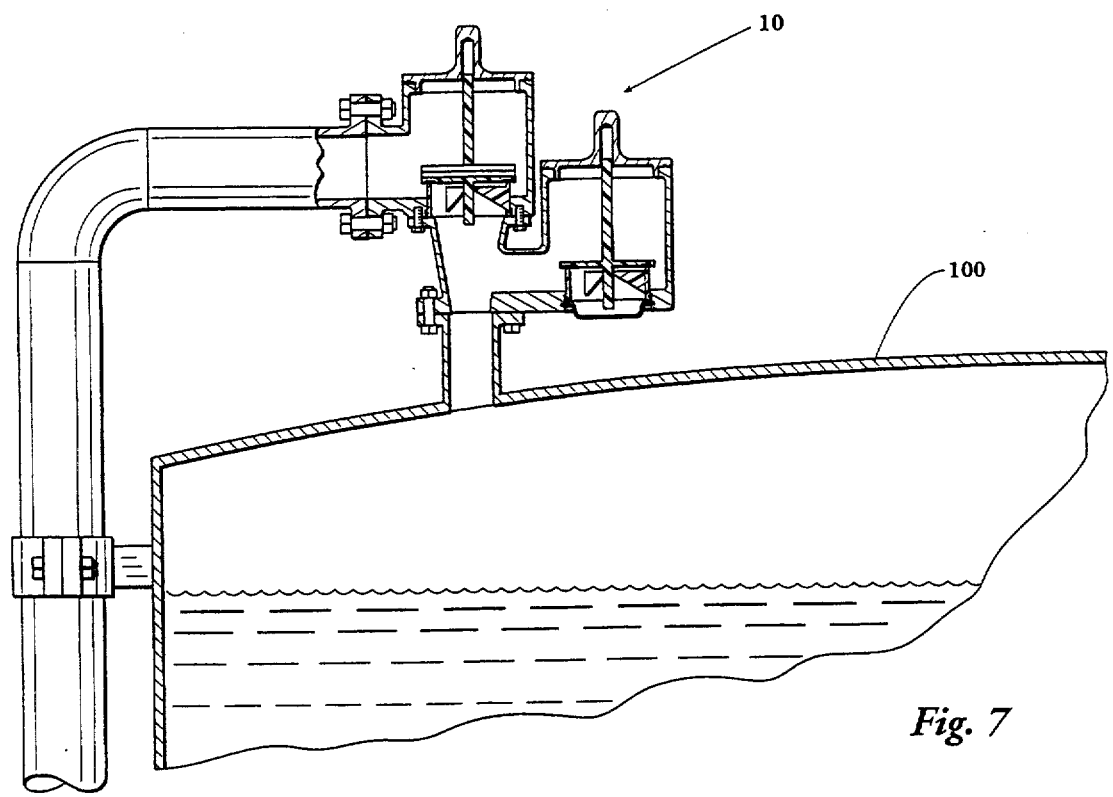

Fig. 7